United States Patent Office.

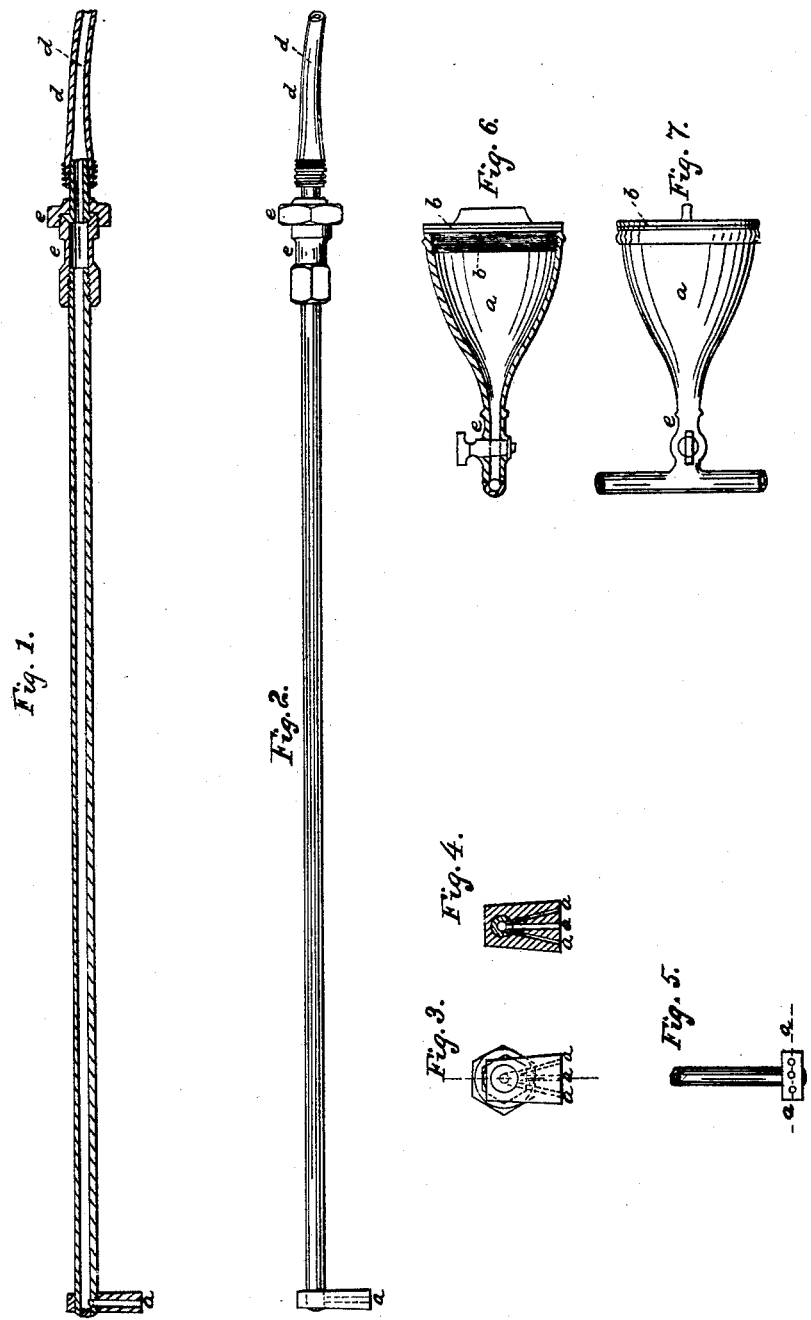

WILLIAM HADEN RICHARDSON, OF GLASGOW, NORTH BRITAIN.

Letters Patent No. 67,350, dated July 30, 1867.

---

IMPROVEMENT IN THE MANUFACTURE OF IRON.

---

The Schedule referred to in these Letters Patent and making part of the same.

---

TO WHOM IT MAY CONCERN:

Be it known that I, WILLIAM HADEN RICHARDSON, of Glasgow, in the county of Lanark, North Britain, have invented certain new and useful Improvements in the Manufacture of Iron, and in the means employed for effecting the same; and I hereby declare the following to be a full, clear, and exact description of the same, reference being had to the accompanying drawings.

This invention, which has for its essential object the diminution of time occupied for bringing a charge of iron "to nature" in the puddling-furnace, as well as for producing an improved quality of metal, consists as follows:

In lieu of the ordinary rabble or paddle at present employed by the puddler for turning over and working up the charge of metal, or in combination therewith, under the present invention a tubular rabble is used, through which atmospheric or other air, gas, steam, water, or other liquid or fluid, or solid matter in a pulverulent form, is introduced under, into, or upon the charge of molten metal in the puddling-chamber, for the purpose of facilitating the process of puddling iron. The tubular rabble to be employed may be made entirely of iron, or partly of iron and partly of fire-clay, or of iron and platina, or platina alone, or of other metal or material, either alone or coated with refractory or fire-resisting material.

In carrying out this invention the different airs, gases, or liquids and solids used, are conducted from any convenient source to and through the tubular rabble, or otherwise.

Under the first application of the tubular rabble, atmospheric air is introduced either underneath, into the body, or the top of the charge of molten metal in the puddling-chamber, for the purpose of facilitating and reducing the time ordinarily occupied for decarbonizing the charge. In place, however, of admitting air in the several ways above described, it may be introduced through a tube in any convenient manner.

Under the second application, a combination of atmospheric air and steam is introduced, through the rabble or otherwise, below, into, or above the charge of molten metal in the puddling-chamber.

Under the third application, atmospheric air is introduced, through the rabble or otherwise, to the bottom, the body, or surface of the charge of molten metal in the puddling-chamber, and with it, or at intervals, fine sprays or jets of water are injected upon the molten metal.

Under the fourth application, atmospheric air and carburetted hydrogen, either combined or separately, are introduced, through the rabble or otherwise, below, into, or above the charge of molten metal.

Under the fifth application, oxygen and hydrogen gases are introduced, through the tubular rabble or otherwise, either in combination or separately, below, into, or above the charge of molten metal.

Under the sixth application, finely-pulverized manganese, or other substance or material containing oxygen, may be introduced, through the tubular rabble or its equivalent, below, into, or above the charge of molten metal, to facilitate the process of puddling.

In lieu of employing a tubular rabble, the ordinary rabble may be employed, and the several gases and materials hereinbefore referred to may be admitted, at the proper time, through a tubular passage situated in any convenient part of the furnace; or an ordinary solid rabble, as well as a tubular rabble, may be both employed, the tubular rabble being used for introducing the gases and matters at the proper time, whilst the ordinary rabble is used for working and balling up the charge.

Description of Drawings.

A charge of pig metal, or partly of pig and partly of refined or plate metal, of the usual weight, is melted, in the ordinary manner, upon the puddling-hearth; and when completely melted I introduce a blast of air of a suitable pressure, which may be of four pounds on the square inch, and upwards, into the body of the molten metal in the puddling-chamber. The manner of introducing the blast which I prefer to employ is to use a hollow rabble of the form shown in section, at Figure 1, on the appended sheet of drawings; in longitudinal elevation at Figure 2; in end elevation at Figure 3; in transverse section (on the line $a\ a$, fig. 5) at Figure 4; and in plan of the under side at Figure 5.

The stem or handle of the rabble is tubular; and the rabbling end has tubular passages $a\ a$ formed in it, diverging from the hole through the tubular stem, as shown at figs. 1, 2, 3, and 4, so that the blast is, in passing out of these several holes, thoroughly dispersed into the mass or body of liquid metal in the puddling-chamber.

The blast may be obtained from any convenient source whatever, such as a blast engine or air-compresser, and it is conducted into and through the hollow rabble by an elastic pipe, *d*, connected thereto by a coupling, *e*.

When the air is blown into the body of the metal it has the effect of boiling it in a shorter time and much more rapidly than by the ordinary boiling process. At the same time the temperature of the puddling-chamber is very considerably increased, so that many impurities and foreign substances are driven off. At the same time, the oxygen of the blast being commingled with the mass or body of the metal, the oxygen attacks the carbon deeply down in the charge, so that the iron is brought to nature more rapidly, the time occupied in bringing it to the pasty or plastic state being also again diminished, partly on account of the intense and rapid ebullition which takes place, exposing more of the metal to the action of the atmospheric oxygen above the charge in the puddling-chamber than what ordinarily takes place.

The length of time for blowing in the blast varies according to the degree of purity or impurity of the metal operated upon; but for ordinary commercial pig iron it will occupy about seven minutes. The time for blowing in will also vary according to the pressure or density of the blast. After the blowing in of the blast has been completed, the hollow or tubular rabble is withdrawn, and the remainder of the process, that is, spreading about and balling up, is continued with the ordinary rabble, by the puddler, in the usual manner.

As soon as the charge is balled up, the rabble is withdrawn, and the balls are allowed to remain in the puddling-chamber for a short time, to sweat out the slag, phosphorus, and other liquescent impurities, after which they are withdrawn and treated under the shingling-hammer and weighing-rolls, and worked up into plates or bars in the ordinary manner.

In using the hollow rabble the puddler manipulates with it in the usual manner, continually moving it about to different regions of the puddling-hearth, so as to expose all parts of the charge to the agitating and purifying influence of the blast.

I wish it to be here expressly understood what I consider to be the valuable feature of this part of my invention is, blowing a blast of air into the mass of metal while it is in the puddling-chamber for so long a time only as shall be required to drive off the chief portion of the carbon and other impurities, thus leaving the metal in a state capable of being finally worked up and finished as ordinary puddled, bar, or malleable iron; and it may be further set forth that I obtain by the process herein specified an improved quality of metal, which is tough, exceedingly fibrous, and pure; and, in contradistinction to what is known as "Bessemer metal," it is capable of being as thoroughly welded as the best brands of commercial iron.

In place of remelting a charge of pig iron in the puddling-furnace, as is ordinarily practised, with my invention this is not necessary, as I sometimes run the charge of crude metal as it is tapped from the blast-furnace into the chamber or hearth of a puddling-furnace, when I treat it by blowing a blast into its mass, and afterwards operate upon it in the same manner as hereinbefore specified in reference to a charge of metal remelted in the puddling-chambers. Thus I obtain malleable iron of an improved quality, in a direct process, from the blast-furnace, without allowing the metal to cool from the time it leaves the blast-furnace until it comes from the rolls as bar or plate iron.

In introducing steam into the mass of metal, in combination with the blast, this may be effected in two ways, namely, by attaching a second tubular opening to the rabble, communicating to the same passage through which the air passes, from which a flexible pipe extends to a steam-boiler, or other reservoir of steam of the pressure necessary for the purpose of my invention, it being here explained that, when the blasts of air and steam are sent in through one and the same rabble, they must be both of nearly equal pressures. In place, however, of introducing the steam and air through one and the same rabble, they may be introduced through a double rabble, or through two rabbles; and in the case of large furnaces, which have a door at each side of the puddling-chamber, the air may be introduced at one side and the steam at the other, a puddler being placed to work each rabble, so that both the blast and air may be thoroughly distributed throughout the body or mass of metal under treatment.

I do not generally introduce steam together with the blast, the latter being in general sufficient for the purposes of my invention. It is to be understood that the time during which the blast is continued to be blown into the mass of metal must be varied according to the quality and degree of purity of the iron to be produced; and in the event of exceedingly fine and pure iron being required, the blast may be continued until the carbon is nearly or completely oxidized out of the molten metal, after which the charge is worked up in the usual manner, as hereinbefore described.

In place of introducing the blast or steam through the rabbles, as hereinbefore described, the furnace may be constructed with openings or passages in the top, sides, or bottom of the puddling-chamber, from which tubes, passages, or their equivalent communicate to that part of the chamber in which the metal is situated, so that the blast of air or steam may be diffused into the mass of metal.

In introducing the pulverized oxide of manganese, or other substance containing oxygen in combination, this may be effected in various ways, and one mode consists in using the apparatus shown at Figures 6 and 7 of the annexed sheet of drawings, which consists of a hollow metallic cup, *a*, provided with a tight-fitting cap-lid or cover, *b*, its lower end being united to a pipe, *c*, from which a pipe or tube extends, or is fitted to the hollow-rabble passage or opening, through which the oxidizing compound is to be introduced into the molten iron. The cup *a* is provided with a tap or cock, so that in being opened the action of the blast or steam draws the pulverized compound out from the cup, and it passes along with the blast into the charge; or, in place of the foregoing arrangements, a tube may be placed to communicate from the front part of the rabble to the upper end of the cup, so that the pressure of the blast may force the pulverized compound out of the lower end of the cup into the rabble, and thence into the molten metal. The rabble shown in the annexed sheet of drawings is made of malleable iron; but the rabbles may be constructed of other metal, fire-clay, or other fire-resisting materials.

Claims.

1. The process or processes of manufacturing or producing improved malleable iron, as hereinbefore described, or any mere modification thereof.

2. The introduction of a blast or blasts of air, or air and steam, either separately or combined, into the body or mass of metal in the puddling-chamber, facilitating the manufacture, and for the purpose of improving the quality of iron, (in contradistinction to blowing air or steam upon the surface of the charge,) as hereinbefore described, or any mere modification thereof.

3. The process of manufacturing iron by first introducing air or steam into its mass in the puddling-chamber, and afterwards finishing it in the manner of puddled iron, as hereinbefore described, or any mere modification thereof.

4. The use and construction of hollow rabbles, passages, or openings, for the purpose of introducing a blast or blasts of air or steam into the mass of molten metal in the puddling-chamber, as hereinbefore described, or any mere modification thereof.

5. The introduction of pulverized oxide of manganese (or other substance containing oxygen in combination) into the mass of molten metal in the puddling-chamber, as hereinbefore described, or any mere modification thereof.

In testimony whereof I, the said WILLIAM HADEN RICHARDSON, have signed my name to this specification in the presence of two subscribing witnesses.

WILLIAM HADEN RICHARDSON.

Witnesses:
J. HENRY JOHNSON,
JOHN J. VIDLER.